May 17, 1949. W. DZUS 2,470,344
FASTENER
Filed July 21, 1945
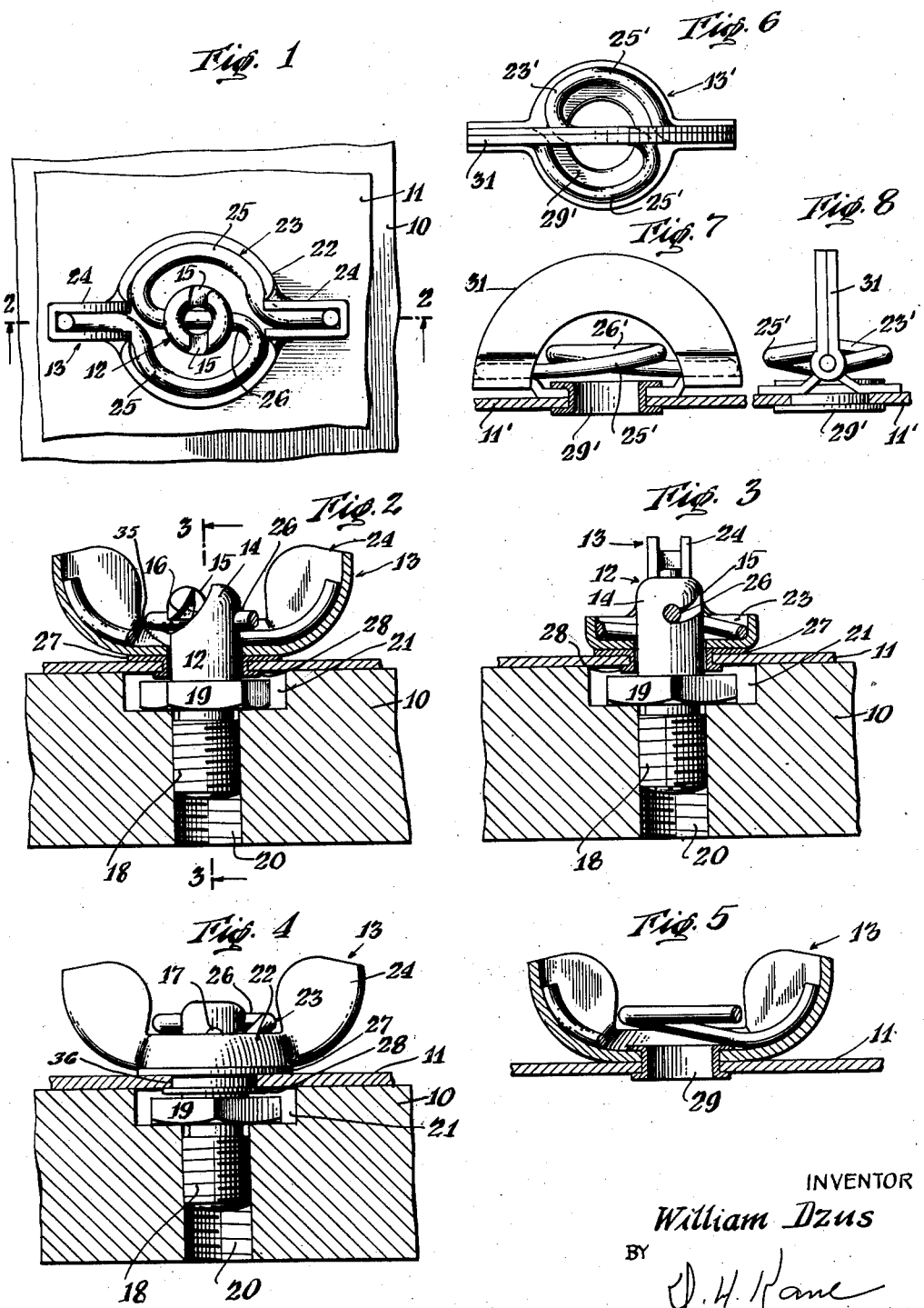
INVENTOR
William Dzus
BY
ATTORNEY Patented May 17, 1949

2,470,344

UNITED STATES PATENT OFFICE 2,470,344

FASTENER

William Dzus, West Islip, N. Y.

Application July 21, 1945, Serial No. 606,313

3 Claims. (Cl. 24—221)

This invention relates to an improved fastener particularly to a fastener of the quick-acting, self-locking type.

This type of fastener is used for releasably attaching two parts and generally consists of a stud member and a spring or receptacle member. The spring or receptacle member is fixedly attached to the frame or stationary part and the stud member is rotatably attached to the removable part. The fastener is closed and released by rotating the stud with respect to the spring or receptacle member. I have found that this arrangement is not always satisfactory due to the fact that at times there is no adequate mounting for the receptacle member and at other times insufficient space is available for the receptacle member. It will also be appreciated that the spring or receptacle member is not a structural member and it does not appreciably strengthen or reinforce the part to which it is attached.

It is an object of the present invention to provide an improved fastening device in which the stud member is fixedly mounted and the spring or receptacle member is mounted so as to be rotatable with respect thereto. This permits the fastener to be used in many places where fasteners of this type could not formerly be used. This is due to the fact that the stud may be mounted in many places where there is insufficient space for the spring or receptacle, or where there is inadequate or unsatisfactory support for the spring or receptacle. It also permits of the use of the stud member as a structural member to strengthen and reinforce the part on which it is mounted.

A further object of the present invention is to provide an improved fastening device in which the spring or receptacle member is readily accessible so as to facilitate its replacement.

Among other objects is the provision of an improved fastening device of relatively simple construction which is easy to install and operate; which is sturdy and durable; and in which the parts may be readily replaced when desired.

In the accompanying drawing:

Fig. 1 is a plan view of a fastening device embodying my invention;

Fig. 2 is a sectional view in the directions of the arrows in line 2—2 in Fig. 1;

Fig. 3 is a sectional view at right angles to Fig. 2 in the direction of the arrows in line 3—3 of Fig. 2;

Fig. 4 is a side elevational view partially in section showing the fastening device in open position;

Fig. 5 is a sectional view of a receptacle member showing modified means for attaching it to the plate;

Fig. 6 is a plan view of a modified type of receptacle member;

Fig. 7 is a side elevational view partially in section of the modified type of receptacle; and Fig. 8 is an end elevational view of the modified type of receptacle.

Referring to the first four figures of the drawing, my fastening device is shown as applied to a fixed part 10 and a removable part 11, which are releasably retained in assembled relationship by means of the fastening device. The fastening device consists generally of a stud member 12 and a receptacle member 13, the stud member being attached to the fixed part 10 and the receptacle member being rotatably attached to the plate 11.

The operative portion of the stud member 12 is of the spiral cam type similar to that shown in my Patent No. 1,955,740, granted April 24, 1934, and consists of a tubular portion 14 having oppositely disposed spiral slots 15, extending inwardly from the end thereof, forming shoulders 16 and terminating in detents 17. The stud is provided with means for fixedly attaching it to the part 10, as for instance, the threaded shank 18 which is threaded into the opening in part 10. To facilitate the attachment of the stud, an integral hexagonal nut portion 19 may be provided as shown. The part 10 may be provided with a threaded opening 20 and a recess 21 for accommodating the nut portion 19. The stud is attached to part 10 by screwing it in position as shown, and if desired, a lock washer or other means may be provided for holding the stud against accidental displacement.

The receptacle member 13 consists of a supporting frame 22 and a spring 23. The supporting frame is preferably formed with a circular portion having a flange around the edge thereof and a central aperture 35 and has two wings or handles 24 at diametrically opposite sides thereof, each of the wings or handles having parallel side walls. The spring 23 is formed of suitable spring material such as music wire, hard drawn steel wire, or the like, and has its two opposite ends anchored in the wings or handles 24, the ends being frictionally engaged by the side walls thereof. The spring then coils around in a pair of oppositely disposed semi-circular coils 25 which spiral upwardly in a direction away from the handle members in which the ends of the spring are anchored. Connecting the coils 25 is the cross-bar 26, which is normally elevated above the surface of the receptacle as shown and is adapted to interengage with the spiral slots 15 of the stud.

Plate 11 is provided with an aperture 36 as shown, which is adapted to receive the shank 14 of the stud and the receptacle member is mounted above the opening so that it may rotate. Many suitable means may be used for this purpose. Thus in Figs. 1 to 4, I have shown a collar 27 which is formed integral with the receptacle, or which may be welded, brazed, soldered or otherwise attached thereto. In applying the receptacle to the plate, the collar is inserted through the aperture and is flared outwardly on the under surface as indicated at 28. This arrangement permits the receptacle to readily rotate with respect to the plate.

In using the fastening device, the stud is fixedly attached to one part as shown, and the receptacle is rotatably attached to the other part. The part 11 is then superimposed on part 10 so that shank 14 of the stud extends through the aperture in part 11. The length of the stud and the height of the spring in the receptable should be arranged so that when the fastener is in open position, the cross-bar 26 will rest in the spiral slots 15 in the manner shown in Fig. 4. Upon rotation of receptacle 13 in a clockwise direction for a quarter of a turn, the cross-bar 26 will be drawn downwardly in the spiral slots 15 and will finally lock behind shoulders 16 in the retaining portions 17 of the slots. To open the fastening device, the receptacle 13 is rotated through a quarter turn in a counter-clockwise direction.

In the modified arrangement shown in Fig. 5, the receptacle 13 is attached to plate 11 by means of a grommet 29 which extends through the circular aperture in the receptacle and through the aperture in plate 11 and is flared outwardly at both ends thereby permitting rotation of the receptacle but preventing separation of the receptacle from the plate.

In the modified arrangement shown in Figs. 6, 7 and 8, I have shown a receptacle 13' which likewise has a central aperture and a circular disk or circular shaped portion. Instead of having wing or handle members on opposite sides thereof, however, I provide a handle member 31 which extends diametrically across the entire receptacle and projects upwardly in a semi-circular or bow shape above the receptacle. The handle portion 31 consists of a pair of parallel walls formed integral with the remainder of the supporting frame and bent upwardly from opposite sides into engagement with each other.

The spring member 23' has its opposite ends anchored in the opposite sides of handle 31 and is frictionally engaged by the side walls thereof. The spring is similar in form to the spring in the first embodiment of my invention and coils upwardly in oppositely disposed substantially circular loops 25', the two coils being connected by cross-bar 26' which is elevated above the base of the receptacle.

This form of my receptacle is attached to a plate or removable part 11' in the same manner as receptacle 13 so that it may be rotated with respect to the plate. In the present instance, I have shown a grommet 29' which extends through the aperture in the receptacle and the aperture in plate 11' and is flared outwardly at its two ends thereby permitting rotation of the receptacle but preventing its separation from the plate. The receptacle is used in connection with a stud similar to stud 12 which is fixedly secured to another part.

From the foregoing description of the several embodiments of my invention, it will be appreciated that I have provided an improved fastening device which is relatively simple to manufacture, install and operate, but which is nevertheless of sturdy construction so that it will give satisfactory service for a long period of time with comparative freedom from wear. It will also be appreciated that the spring or receptacle member is readily accessible so that it can be replaced or repaired if it is damaged. It will also be understood that the stud member does not require much space and that it can also be used as a structural member to reinforce and strengthen the part to which it is attached.

Modifications may be made in the illustrated and described embodiment of the invention without departing from the invention as set forth in the accompanying claims.

I claim:

1. In a fastening device, a receptacle member of the type engageable with a stud member upon rotation with respect thereto and comprising a base plate having an aperture therein; handle means on said base plate for use in rotating the same; and a wire spring supported on said base plate and formed with a cross-bar portion extending across the aperture, loop portions connected to opposite ends of the cross-bar portion, and anchor portions connected to the outer ends of the loop portions and frictionally held and anchored in the handle means.

2. In a fastening device, a receptacle member of the type engageable with a stud member upon rotation with respect thereto and comprising a base plate having an aperture therein; handle means on said base plate for use in rotating the same and comprising two portions integral with the base formed at right angles thereto and disposed in close parallel relationship; and a wire spring supported on said base plate and formed with a cross-bar portion extending across the aperture a short distance above the base plate, a pair of semi-circular loop portions connected to opposite ends of the cross-bar portion and anchor portions extending outwardly from the ends of the loop portions and frictionally held and anchored between the two portions of the handle means.

3. In a fastening device, a receptacle member as set forth in claim 2, in which the handle means has portions on diametrically opposite sides of the base plate.

WILLIAM DZUS.

REFERENCES CITED

The following references are of record in the file of this patent:

UNITED STATES PATENTS

| Number | Name | Date |
| --- | --- | --- |
| 2,401,057 | Dorgelys | May 28, 1946 |